United States Patent
Bendapudi et al.

(10) Patent No.: US 8,087,006 B2
(45) Date of Patent: Dec. 27, 2011

(54) STATIC PERFORMANCE ANALYSIS OF SOFTWARE

(75) Inventors: Perraju Bendapudi, Hyderabad (IN); Phani Kishore Talluri, Secunderabad (IN); Rajesh Jalan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1244 days.

(21) Appl. No.: 11/756,579

(22) Filed: May 31, 2007

(65) Prior Publication Data

US 2008/0301650 A1    Dec. 4, 2008

(51) Int. Cl.
*G06F 9/44* (2006.01)
(52) U.S. Cl. .......... 717/130; 717/124
(58) Field of Classification Search ........... 717/124–135
See application file for complete search history.

(56) References Cited

U.S. PATENT DOCUMENTS

| | | | | |
|---|---|---|---|---|
| 5,465,258 A * | 11/1995 | Adams | ......... | 717/128 |
| 5,732,273 A * | 3/1998 | Srivastava et al. | ......... | 717/128 |
| 5,963,740 A * | 10/1999 | Srivastava et al. | ......... | 717/130 |
| 5,966,541 A * | 10/1999 | Agarwal | ......... | 717/132 |
| 6,070,009 A * | 5/2000 | Dean et al. | ......... | 717/130 |
| 6,305,010 B2 * | 10/2001 | Agarwal | ......... | 717/126 |
| 6,668,372 B1 * | 12/2003 | Wu | ......... | 717/130 |
| 6,748,584 B1 * | 6/2004 | Witchel et al. | ......... | 717/136 |
| 7,058,941 B1 * | 6/2006 | Venkatesan et al. | ......... | 717/168 |
| 7,681,190 B2 * | 3/2010 | Venkatesan et al. | ......... | 717/168 |
| 7,685,590 B2 * | 3/2010 | Venkatesan et al. | ......... | 717/168 |
| 2004/0221270 A1 * | 11/2004 | Witchel et al. | ......... | 717/124 |
| 2005/0251790 A1 * | 11/2005 | Hundt | ......... | 717/130 |
| 2005/0251791 A1 * | 11/2005 | Hundt | ......... | 717/130 |
| 2006/0145895 A1 * | 7/2006 | Venkatesan et al. | ......... | 341/50 |
| 2006/0145896 A1 * | 7/2006 | Venkatesan et al. | ......... | 341/50 |
| 2007/0006167 A1 * | 1/2007 | Luk et al. | ......... | 717/130 |
| 2007/0124353 A1 * | 5/2007 | Cockcroft et al. | ......... | 708/200 |
| 2007/0226703 A1 * | 9/2007 | Sharapov et al. | ......... | 717/131 |

* cited by examiner

*Primary Examiner* — Wei Zhen
*Assistant Examiner* — Qing Chen
(74) *Attorney, Agent, or Firm* — L. Alan Collins; Collins & Collins Incorporated

(57) ABSTRACT

Technologies for estimating deviations in the performance characteristics of a newer version of software relative to an older version. Such performance characteristics include cache misses, pages faults, and the like. Estimations are typically made by instrumenting and profiling an older version binary, determining differences in code blocks between the older and a newer version, propagating profile data from the older version to the newer version based on a simulation heuristic, and estimating performance deviations based on the older version, the profile data, configuration parameters, and the changes in the newer version without actually executing the newer version of the binary.

20 Claims, 3 Drawing Sheets

STATIC PERFORMANCE ANALYSIS OF SOFTWARE

BACKGROUND

Software testing can be complex and expensive. One import form of testing is to test that the performance characteristics of a newer version of software is acceptable relative to the older version. When dealing with very large software, such performance testing can be very time-consuming and expensive. Such testing typically includes instrumenting the software, executing the instrumented software, and profiling the execution to determine performance characteristics such as cache misses, pages faults, and the like. Techniques for reducing performance testing costs are desirable.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples include systems and methods for estimating deviations in performance characteristics of a newer version of software relative to an older version. Such performance characteristics include cache misses, pages faults, and the like. Estimations are typically made by instrumenting and profiling an older version binary, determining differences in code blocks between the older and a newer version, propagating profile data from the older version to the newer version based on a simulation heuristic, and estimating performance deviations based on the older version, the profile data, configuration parameters, and the changes in the newer version without actually executing the newer version of the binary.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of environments.

Figure 1:
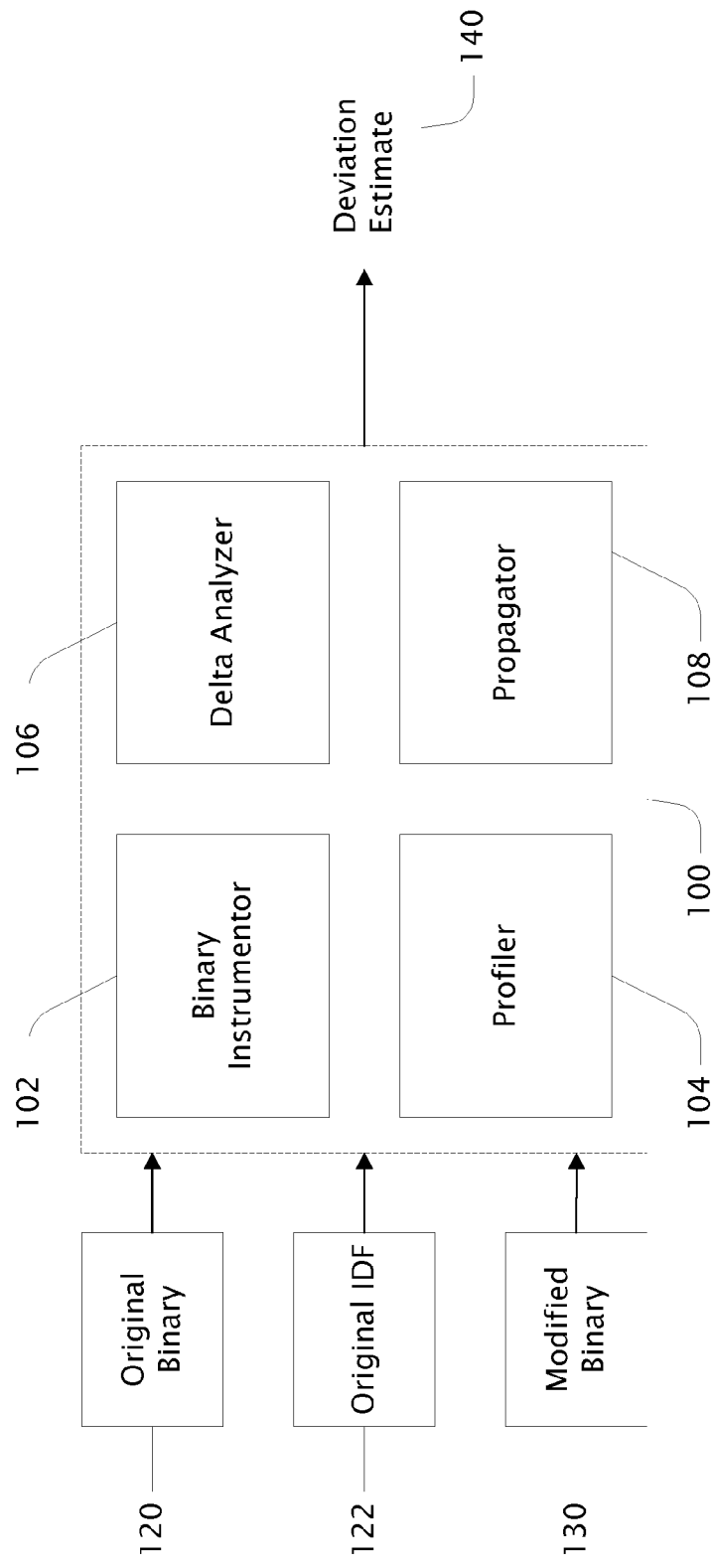
FIG. 1 is a block diagram of an example static performance analysis ("SPA") system along with various example inputs and outputs.

FIG. 1 is a block diagram of an example static performance analysis ("SPA") system 100 along with various example inputs 120, 122, and 130 and outputs 140. SPA 110 typically accepts original binary 120, original instrumentation data file ("IDF") 122, and modified binary 130 as inputs. As used herein, the term "binary" refers to a binary file (or set of binary files) such as an executable file (such as an ".EXE" or ".COM" file), a dynamic link library ("DLL"), or the like that can be run or executed in a computing environment such as that described in connection with FIG. 3. A software application or the like is typically comprised of a set of one or more such binary files; SPA system 100 is typically used to perform relative performance testing on modified or newer versions of such software applications. Modified binary 130 is modified relative to original binary 120. For example, original binary 120 may be version 2.4 of CALC.EXE (an example calculator program) and modified binary 130 may be version 3.7 of CALC.EXE, a newer version of the older 2.4 version. In general, modified binary 130 is a newer or modified version of original binary 120, which need not be the first version but simply a previous version to the modified version.

Original IDF 122 is an example instrumentation data file associated with original binary 120. Such an IDF is typically created by SPA system 100 instrumenting and processing original binary 120. In one example, such instrumenting and processing may be provided by Vulcan technology ("Vulcan") described at least in part by U.S. Pat. No. 6,460,178 "Shared Library Optimization for Heterogeneous Programs"; U.S. Pat. No. 6,481,008 "Instrumentation and Optimization Tools for Heterogeneous Programs"; U.S. Pat. No. 6,609,248 "Cross Module Representation of Heterogeneous Programs"; U.S. Pat. No. 6,662,356 "Application Program Interface for Transforming Heterogeneous Programs"; and U.S. Pat. No. 6,802,056 "Translation and Transformation of Heterogeneous Programs"; all of which are assigned to the assignee of this application and each of which is incorporated herein by reference in its entirety, for all they teach and suggest. In other examples, other technologies and/or methodologies may be used.

An IDF created by SPA system 100 typically contains profile data including at least the following information: block edge counts ("BEC") in conditional branch cases; and time ordered bits ("TOB"). The term "block" as used herein, also known as a basic block or a code block, is generally a set of contiguous instructions (code) in the physical layout of a binary that has exactly one entry point and one exit point. Calls, jumps, and branches mark the end of a block. A block typically consists of one or more machine-code instructions. The edges of a block specify the blocks that call the entry point of the block, and the blocks that are called by the exit point of the block. Thus, the edges of a block represent all possible execution paths through the block. The term "time ordered bits" as used herein generally refers to information identifying which blocks would be executed during a time slot, such as a 30 millisecond time slot for example.

SPA system 100 generally further accepts configuration parameters. Such parameters typically include the following: maximum number of pages that can be allocated; number of read-ahead pages; page replacement policy (such as least recently used ("LRU") or the like); total cache size (for example, 64 kilobytes); size of cache line (for example, 32 bytes each cache line); set associativity of level 1 ("L1") and level 2 ("L2") cache; and translation lookaside buffer ("TLB") configuration. Such configuration parameters may be specified by a user such as a person or other system or the like via any suitable interface. The maximum number of pages that can be allocated typically refers to those pages that can be allocated for the binary being analyzed, such as original binary 120 and/or modified binary 130. Alternative and/or additional configuration parameters may also be used. Performance characteristics are typically determined for original binary 120 based on configuration parameters and/or profile data, such characteristics typically including cache misses, page faults, TLB misses, and the like. Such performance characteristics may be added to the profile data associated with original binary 120.

SPA system 100 is typically comprised on four main elements or modules: binary instrumentor ("INST") 102; profiler ("PROF") 104; delta analyzer ("LYZR") 106; and propagator ("PROP") 108. Example INST 102 typically instruments original binary 120 and/or modified binary 130 such that an instrumented binary calls a runtime library to generate an IDF during execution. In one example, INST 102 functionality is provided, at least in part, by Vulcan. Example PROF 104 typically executes an instrumented binary resulting in an IDF containing profile data. In one example, PROF 104 functionality is provided, at least in part, by Vulcan. Example LYZR 106 typically performs a delta analysis on original binary 120 and modified binary 140 to determine which blocks in modified binary 130 are different from those of original binary 120. Such differences may include deleted blocks, modified blocks and/or new blocks. In one example, LYZR 106 functionality is provided, at least in part, by Vulcan. Example PROP 108 typically propagates profile data from original IDF 122 associated with original binary 120 to a new set of profile data associated with modified binary 130. An example propagation method is described in connection with FIG. 2.

Example deviation estimate 140 represents output from SPA system 100 indicating an estimated deviation in performance of modified binary 130 from original binary 120. Estimate 140 is typically calculated by simulating the execution of modified binary 130 based on differences between original binary 120, and modified binary 130 and the analysis of profile information in original IDF 122, as determined at least in part by INST 102, PROF 104, LYZR 106, and PROP 108 of SPA system 100. The term "performance" as used herein generally refers to page faults, cache misses, and other execution characteristics relative to the configuration parameters of SPA system 100. Such performance may be determined by instrumenting, executing, and profiling original binary 120 as well as by calculating a deviation estimate of modified binary 130 relative to the performance of original binary 120.

Figure 2:
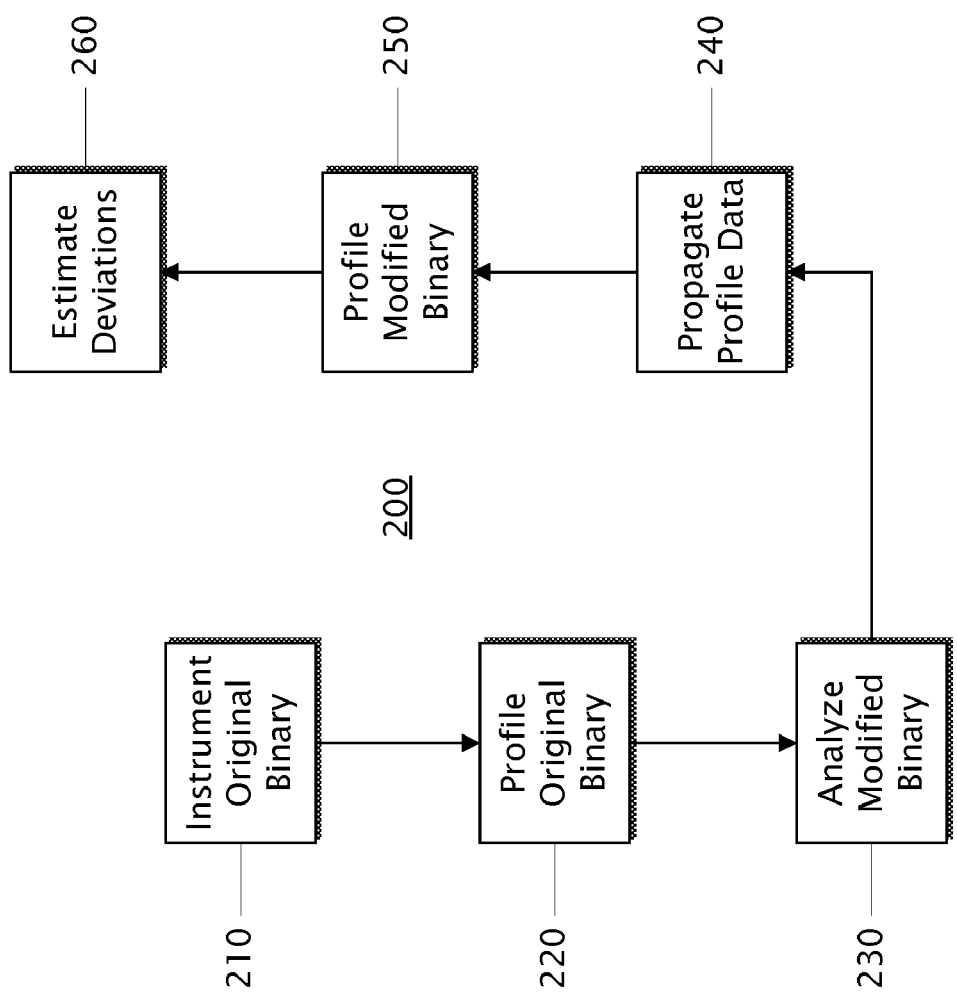
FIG. 2 is a block diagram showing an example method for estimating a deviation in performance of a modified binary relative to an original binary.

FIG. 2 is a block diagram showing an example method 200 for estimating a deviation in performance of a modified binary relative to an original binary. Such a method is typically performed by an SPA system, such as system 100 described in connection with FIG. 1. Such a method is typically used to calculate and estimated deviation in performance of a newer binary relative to an older version of the newer binary without actually executing the newer binary. If the estimated deviation is within a statistically insignificant range, then a software testing team may determine that a full execution test of the newer binary is unwarranted. Such estimations can be helpful in reducing costs when testing the binaries of very large software applications as performance testing via instrumentation, execution, and profiling can be very time consuming and expensive.

Block 210 typically indicates instrumenting an original or older binary. In one example, instrumenting is performed by Vulcan. Once the older version binary has been instrumented, method 200 typically continues at block 220.

Block 220 typically indicates profiling the older version binary. Profiling typically includes executing the instrumented binary such that associated profile data is created. Profiling also typically includes determining performance data for the older binary based at least in part on the profile data and on configuration parameters such as those described in connection with FIG. 1. In one example, such profiling is performed at least in part by Vulcan. Once the older version binary has been profiled, method 200 typically continues at block 230.

Block 230 typically indicates analyzing a modified or newer version binary. Such a newer binary is typically a newer version of the older or original binary described in connection with blocks 210 and 220. Analysis typically includes identifying code blocks within the newer binary and determining differences in blocks of the newer binary relative to the older binary. Such differences may include deleted blocks, modified blocks and/or new blocks. Once the newer version binary has been analyzed, method 200 typically continues at block 240.

Block 240 typically indicates propagating profile data of the older binary to the newer binary. In one example, propagation is performed using the following heuristic: For a block of the newer binary that is the same as a corresponding block of the older binary, propagate the corresponding profile data for the newer binary; for a modified block, propagate profile data related to the corresponding older block; for a new block, propagate profile data related to a corresponding original block that proceeds the new block; and for a deleted block, do not propagate profile data for the deleted block. Once profile data has been propagated for the newer binary, method 200 typically continues at block 250.

Block 250 typically indicates profiling the modified or newer version binary using the propagated profile data. In one example, the profiling includes: simulating execution of the newer binary by starting with the first TOB interval and reading all blocks that would be executed in that interval; building a block graph with edges indicating dependencies between blocks, possibly resulting in multiple independent graphs; simulating execution using one of the independent graphs; determining simulated performance characteristics including page faults, cache misses, TLB misses, and the like based at least in part on propagated profile data and/or configuration parameters. Once profiling and determining of simulated performance characteristics are complete, method 200 typically continues at block 260.

Block 260 typically indicates estimating performance deviations of the newer binary relative to the older binary. Such estimations are typically made based on the simulated performance characteristics described in connection with block 250 of the newer binary relative to the profile data and/or performance characteristics of the older binary. Once the deviation estimates are made, method 200 is typically complete.

Figure 3:
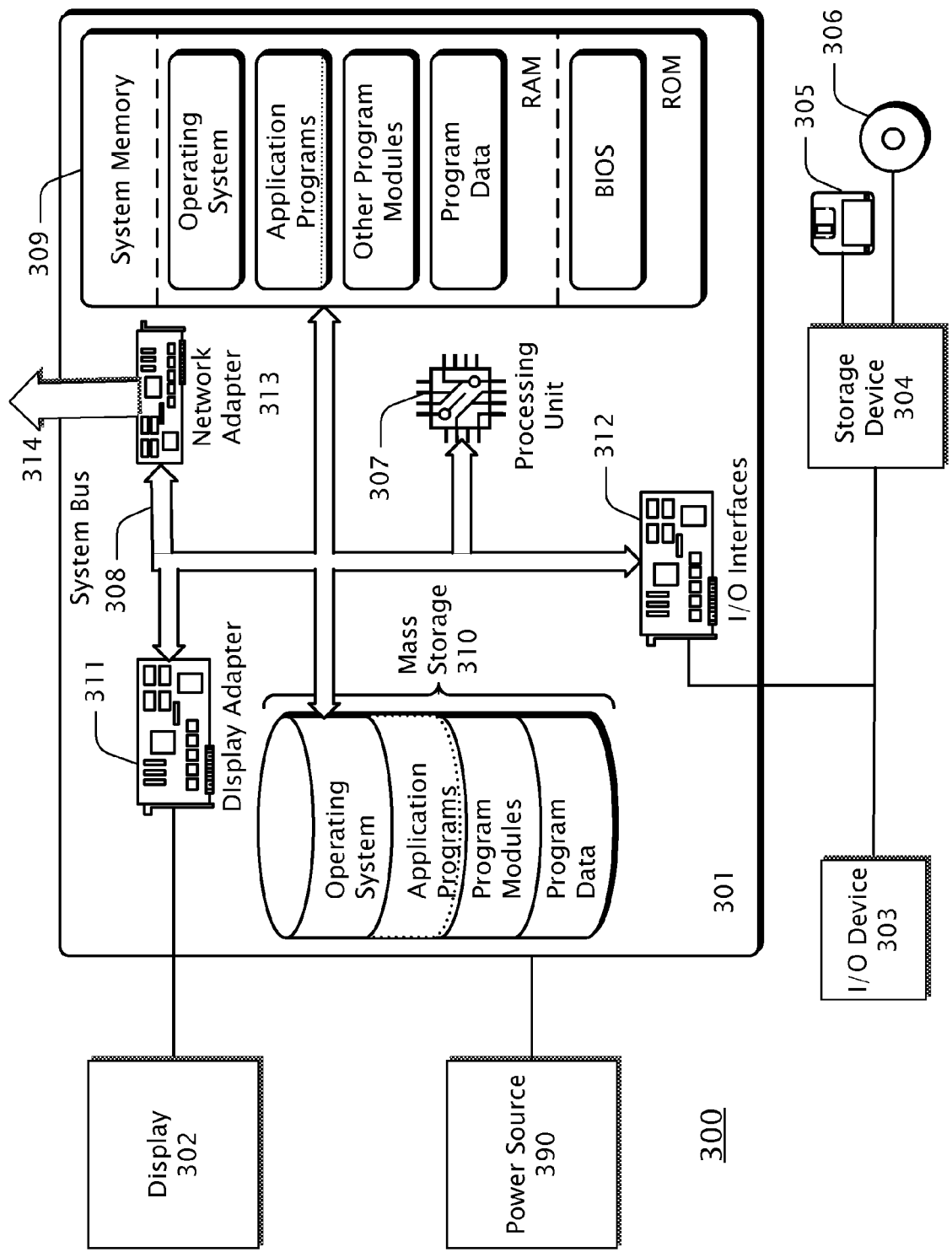
FIG. 3 is a block diagram showing an example computing environment in which the technologies described herein may be implemented.

FIG. 3 is a block diagram showing an example computing environment 300 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("µP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, in the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The terms "computer-readable medium" and "computer-readable media" typically refer to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. An estimation system configured for estimating a deviation in performance of a newer binary relative to an older binary, the estimation system comprising:
   at least one processor;
   a binary instrumentor implemented at least in part by the at least one processor and configured for instrumenting the older binary and the newer binary;
   a profiler implemented at least in part by the at least one processor and configured for providing, based on executing the instrumented older binary, profile data of the executed instrumented older binary;
   a delta analyzer implemented at least in part by the at least one processor and configured for determining code block differences between the newer binary and the older binary; and
   a propagator implemented at least in part by the at least one processor and configured for propagating portions of the profile data of the older binary for the newer binary based on a heuristic that includes:
      for a code block of the newer binary that is the same as a code block of the older binary, propagating for the newer binary profile data that corresponds to the code block of the newer binary that is the same as the code block of the older binary,
      for a code block of the newer binary that is a modified version of a code block of the older binary, propagating for the newer binary profile data that corresponds to the code block of the newer binary that is the modified version of the code block of the older binary,
      for a code block of the newer binary that is not present in the older binary, propagating for the newer binary profile data that corresponds to a code block of the older binary that corresponds to a block of the newer binary that precedes the code block of the newer binary that is not in the older binary, and
      for a code block of the older binary that is not present in the newer binary, not propagating for the newer binary profile data that corresponds to the code block of the older binary that is not present in the newer binary.

2. The system of claim 1 wherein the instrumented older binary is executed to create an instrumentation data file including the profile data.

3. The system of claim 1 wherein the code block differences include new code blocks.

4. The system of claim 1 wherein the code block differences include modified code blocks.

5. The system of claim 1 further comprising configuration parameters.

6. The system of claim 5 further comprising a means for determining simulated performance characteristics of the newer binary based at least in part on the profile data or the configuration parameters.

7. The system of claim 5 wherein the configuration parameters include a maximum number of pages.

8. The system of claim 5 wherein the configuration parameters include a number of read ahead pages.

9. The system of claim 5 wherein the configuration parameters include a page replacement policy.

10. The system of claim 5 wherein the configuration parameters include a cache size.

11. The system of claim 5 wherein the configuration parameters include a size of a cache line.

12. The system of claim 5 wherein the configuration parameters include a set associativity.

13. The system of claim 1 wherein the profile data includes a block edge count.

14. The system of claim 1 wherein the profile data includes time ordered bits.

15. A method of estimating a performance deviation of a newer binary relative to an older binary, the method comprising:
   instrumenting the older binary;
   profiling the instrumented older binary, the profiling based at least in part on configuration parameters and resulting in profile data and performance characteristics of the older binary;
   analyzing, by a computer, the newer binary and the older binary, the analyzing resulting in a list of block differences between the older binary and the newer binary;
   propagating portions of the profile data of the older binary for the newer binary based at least in part on the list of block differences and a heuristic that includes:
      for a block of the newer binary that is the same as a block of the older binary, propagating for the newer binary profile data that corresponds to the block of the newer binary that is the same as the block of the older binary,
      for a block of the newer binary that is a modified version of a block of the older binary, propagating for the newer binary profile data that corresponds to the block of the newer binary that is the modified version of the block of the older binary,
      for a block of the newer binary that is not in the older binary, propagating for the newer binary profile data that corresponds to a block of the older binary that corresponds to a block of the newer binary that precedes the block of the newer binary that is not in the older binary, and for a block of the older binary that is not present in the newer binary, not propagating for the newer binary profile data that corresponds to the block of the older binary that is not present in the newer binary; and calculating estimated performance characteristics of the newer binary relative to the older binary based at least in part on the propagated profile data and the configuration parameters.

16. The method of claim 15 further comprising estimating deviations in performance of the newer binary relative to the older binary, the estimating based at least in part on the estimated performance characteristics of the newer binary and the performance characteristics of the older binary.

17. The method of claim 15 wherein the list of block differences identifies new blocks, modified blocks, and deleted blocks of the newer binary.

18. The method of claim 15 wherein the configuration parameters include a maximum number of pages, a page replacement policy, and a cache size.

19. A computer-readable medium with computer-executable instructions stored thereon, the computer-executable instructions sufficient to cause a computing environment to perform a method for estimating a performance deviation of a newer binary relative to an older binary, the method comprising:

instrumenting the older binary;

profiling the instrumented older binary, the profiling based at least in part on configuration parameters and resulting in profile data and performance characteristics of the older binary;

analyzing the newer binary and the older binary, the analyzing resulting in a list of block differences between the older binary and the newer binary;

propagating portions of the profile data of the older binary for the newer binary based at least in part on the list of block differences and a heuristic that includes:

for a block of the newer binary that is the same as a block of the older binary, propagating for the newer binary profile data that corresponds to the block of the newer binary that is the same as the block of the older binary, for a block of the newer binary that is a modified version of a block of the older binary, propagating for the newer binary profile data that corresponds to the block of the newer binary that is the modified version of the block of the older binary, for a block of the newer binary that is not in the older binary, propagating for the newer binary profile data that corresponds to a block of the older binary that corresponds to a block of the newer binary that precedes the block of the newer binary that is not in the older binary, and for a block of the older binary that is not present in the newer binary, not propagating for the newer binary profile data that corresponds to the block of the older binary that is not present in the newer binary; and calculating estimated performance characteristics of the newer binary relative to the older binary based at least in part on the propagated profile data and the configuration parameters.

20. The computer-readable medium of claim 19, the method further comprising estimating deviations in performance of the newer binary relative to the older binary, the estimating based at least in part on the estimated performance characteristics of the newer binary and the performance characteristics of the older binary.

* * * * *